United States Patent
Zahout-Heil

(10) Patent No.: US 7,975,553 B2
(45) Date of Patent: Jul. 12, 2011

(54) PRESSURE SENSOR UNIT

(75) Inventor: Carsten Zahout-Heil, Darmstadt (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 624 days.

(21) Appl. No.: 12/088,705

(22) PCT Filed: Aug. 23, 2006

(86) PCT No.: PCT/EP2006/065604
§ 371 (c)(1), (2), (4) Date: Mar. 31, 2008

(87) PCT Pub. No.: WO2007/023169
PCT Pub. Date: Mar. 1, 2007

(65) Prior Publication Data
US 2009/0308165 A1    Dec. 17, 2009

(30) Foreign Application Priority Data

Aug. 23, 2005 (DE) .......................... 10 2005 039 977
Aug. 23, 2006 (DE) .......................... 10 2006 039 421

(51) Int. Cl.
*G01L 7/00* (2006.01)
(52) U.S. Cl. ......................................................... 73/756
(58) Field of Classification Search ........................ None
See application file for complete search history.

(56) References Cited

U.S. PATENT DOCUMENTS

| 4,852,581 | A | 8/1989 | Frank |
| 4,972,717 | A | 11/1990 | Southworth et al. |
| 5,461,922 | A * | 10/1995 | Koen .............................. 73/756 |
| 5,581,226 | A | 12/1996 | Shah |
| 6,263,739 | B1 | 7/2001 | Seefried et al. |
| 6,311,561 | B1 | 11/2001 | Bang et al. |
| 7,162,925 | B2 | 1/2007 | Dietrich |
| 2009/0183573 | A1 * | 7/2009 | Fricke et al. .................... 73/716 |
| 2009/0308168 | A1 * | 12/2009 | Motoyama ...................... 73/717 |

FOREIGN PATENT DOCUMENTS

| DE | 29619276 | 1/1997 |
| DE | 19645613 | 9/1997 |
| DE | 19832681 | 2/2000 |
| GB | 1178130 | 1/1970 |
| GB | 1180093 | 2/1970 |

* cited by examiner

*Primary Examiner* — Andre J Allen

(57) ABSTRACT

Pressure sensor unit, in particular for a vehicle brake system, including a housing (2) in which at least one sensor element (1) is arranged which includes a deformation body (6) and at least one sensor means (7) arranged on the deformation body (6) for sensing a deformation of the deformation body (6), in which case at least the part of the housing (2) which is connected to the sensor element (1) and the part of the sensor element (1) which is connected to the housing (2) are fabricated from the same plastic material or from plastic materials having identical or almost identical temperature expansion coefficients, or in that at least part of the housing (2) and part of the sensor element (1) is designed as a one-piece injection molded part made of plastics.

8 Claims, 2 Drawing Sheets

PRESSURE SENSOR UNIT

BACKGROUND OF THE INVENTION

The present invention relates to a pressure sensor unit for a vehicle brake system, including a housing (2) in which at least one sensor element (1) is arranged which includes a deformation body (6) and at least one sensor means (7) arranged on the deformation body (6) for sensing a deformation of the deformation body (6).

Measuring the vacuum in a pneumatic brake booster is typically executed using an externally fitted sensor. The sensor is coupled to the interior of the brake booster by means of a connecting piece. Depending on the respective design, the pressure is measured in only one chamber or in both chambers of the brake booster.

WO 02/098718 A1 discloses a vacuum brake booster of a vehicle brake system with a sensor unit for sensing pressures, with the sensor unit including two sensor elements in one common housing.

Prior art pressure sensors typically comprise a pressurizable deformation body, in most cases one deformable diaphragm or pressure measuring plate which is possibly arranged on a base member, as well as a sensor means arranged of the deformation body, which determines the pressure-responsive displacement or deformation of the deformation body. The sensor means can be based on a capacitive or resistive measuring principle.

When the sensor means is designed as a capacitor structure (capacitive measuring principle), at least one electrically conductive measuring electrode is disposed in the area of the diaphragm surface so that it is moved by the deformable diaphragm surface. In addition, a back plate electrode is provided which is attached to the base member and along with the measuring electrode forms a capacitor. The pressurization alters the displacement of the diaphragm and, thus, the distance of the capacitor plates. The change in capacity entailed can be taken into account as an indicator of the pressure. For example, capacitive sensors made of ceramics are used which are fitted to a housing by means of ring seals and are this way sealed against the medium of measurement.

When the sensor means is designed with pressure-sensitive resistors (resistive measuring principle), resistive structures are fitted on the diaphragm (on the deformation body), and the resistance value depends on the deformation or flexure of the diaphragm and, thus, is also an indicator of the pressure applied. The deformation bodies employed are made of ceramics or metal. Document DE 102 52 023 B3 discloses a pressure sensor which has a plastic deformation body that can be made by injection molding, for example.

Monolithic, piezoresistive dies (structures) are frequently employed, which are fitted to a ceramic base using an elastic adhesive with silicon. A boron silicate glass is frequently interposed between the piezoresistive structure and the ceramic base in addition. The measuring pressure is then introduced from below through a hole in the ceramic base (and, if provided, in the boron silicate glass) to the electrically inactive surface of the sensor. The top side of the sensor element must be protected against dirt and vibrations by way of a sealing compound likewise containing silicon.

The use of silicon in the area of the brake booster is undesirable for various reasons. For example, silicon impairs the conductivity of contact surfaces, what can cause malfunctions of the brake booster.

Prior art pressure sensor units, as disclosed in the document DE 196 37 763, for example, generally comprise a housing with a supply opening for the pressure medium, the pressure of which must be determined. The housing of the sensor unit is connected to the system to be monitored e.g. by a thread or other means of attachment. The pressure medium is supplied through the supply opening to the sensor element arranged in or at the housing. In this case, the sensor element is required to be pressure-tightly coupled to the housing or the ceramic base. As is known, this is executed by gluing with an elastic adhesive which contains silicon, or by a press fit, e.g. using a spring, and with simultaneous sealing by means of a sealing material, e.g. a ring seal.

Based on the above state of the art, the invention has for its object to provide an improved pressure sensor unit, which exhibits a simple and cost effective and, additionally, pressure-tight, durable and especially non-silicon connection between housing and sensor element.

SUMMARY OF THE INVENTION

The invention achieves this object by the pressure sensor unit including a housing (2) in which at least one sensor element (1) is arranged which includes a deformation body (6) and at least one sensor means (7) arranged on the deformation body (6) for sensing a deformation of the deformation body (6). at least the part of the housing (2) which is connected to the sensor element (1) and the part of the sensor element (1) which is connected to the housing (2) are fabricated from the same plastic material or from plastic materials having identical or almost identical temperature expansion coefficients, or in that at least part of the housing (2) and part of the sensor element (1) is designed as a one-piece injection molded part made of plastics.

The invention is based on the idea that the housing and the sensor element or at least the part of the housing which is connected to the sensor element and the part of the sensor element which is connected to the housing are fabricated from the same plastic material or from plastic materials having identical or almost identical temperature expansion coefficients. This fact makes it simpler to interconnect the housing and the sensor element. Novel technical coupling possibilities open up. Housing and sensor element or parts of the housing and the sensor element may even, what is preferred, be designed as a one-piece injection molded part.

It is preferred that the housing and the sensor element are interconnected in an inelastic fashion. This is appropriate under technical aspects because the housing and the sensor element preferably consist of the same material or materials with similar temperature expansion coefficients so that there is no need for an elastic connection which compensates tensions between the two parts.

To realize a pressure-tight and durable connection between housing and sensor element without the use of additional cementing agents, according to a preferred embodiment, the housing and the sensor element are inelastically interconnected by way of welding, cementing, spray-depositing, extrusion-coating or casting integral.

The housing and the sensor element are preferred to be interconnected using an adhesive without silicon. This allows using the pressure sensor unit in an environment in which the use of silicon is prohibited.

The housing and the sensor element are preferably interconnected by laser welding or ultrasonic welding.

According to another preferred embodiment of the pressure sensor unit, the housing and the deformation body of the sensor element are configured as a one-piece injection-molded part. This renders it unnecessary to retroactively connect the housing to the deformation body.

In the one-piece embodiment of housing and deformation body, the sensor means is preferred to be applied to the deformation body by coating after fabrication of the injection-molded part.

According to an improvement of the pressure sensor unit, the sensor means and, as the case may be, an evaluating circuit is printed and/or vacuum metallized and/or sputtered onto the deformation body.

One advantage achieved by the invention involves that there is no need to use a silicon-containing adhesive for the connection of housing and sensor means which could contaminate the surfaces of other components due to exhalation. Furthermore, it is an advantage for the pressure sensor unit of the invention that no additional cementing agent is required, which would incur extra cost.

Further preferred embodiments of the invention can be seen in the following description by way of Figures.

DETAILED DESCRIPTION OF THE DRAWINGS

The invention deals with the connection between a sensor element and the housing of the pressure sensor. Due to different coefficients of expansion of the sensor and the sensor support (housing or printed circuit board), the joint is required to be elastical in the prior art pressure sensors. Previously, this has been executed by way of cementing or by seals.

The use of polymer as a sensor material or as a housing material according to the invention offers new possibilities of connection, with the same material or materials with similar coefficients of expansion being employed.

Figure 1:
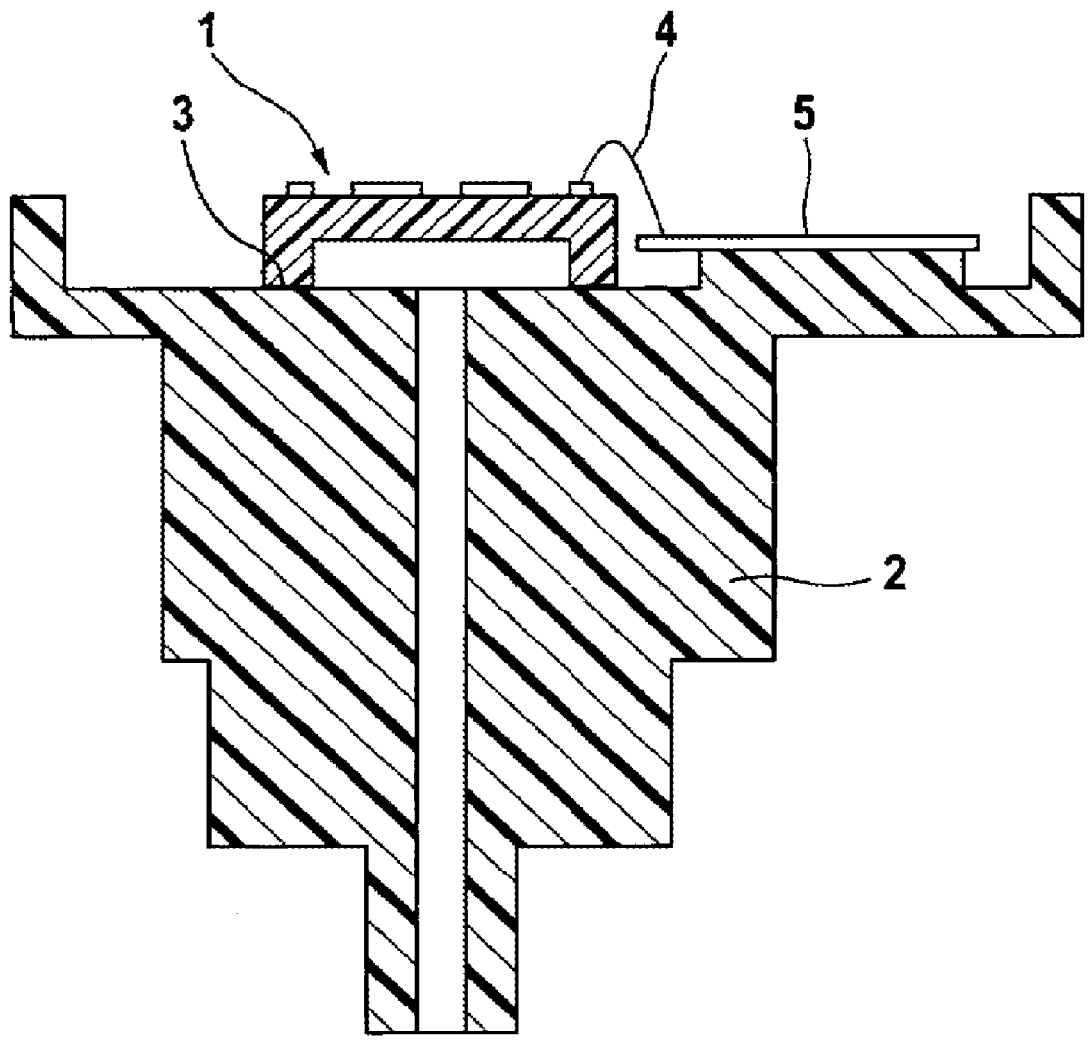
FIG. 1 is a first embodiment of a pressure sensor unit of the invention.

FIG. 1 illustrates a first embodiment of a pressure sensor unit of the invention. Sensor element 1 which is made of a polymer is connected to housing 2 (bottom side) by welding. A pressure-tight connection is thereby established. Weld joint 3 between sensor element 1 and housing 2 can be made by laser welding or ultrasonic welding. Sensor element 1 is connected by bond 4 to board 5 on which electric circuits are arranged.

Since sensor element 1 and housing 2 are fabricated from the same material or from two materials with an identical or similar coefficient of expansion, the joint can also be achieved inelastically by cementing in a second embodiment which is not shown separately. Hence, bonding agents without silicon content are also feasible. This allows using the exemplary sensor unit also for non-silicon fields of application.

Figure 2:
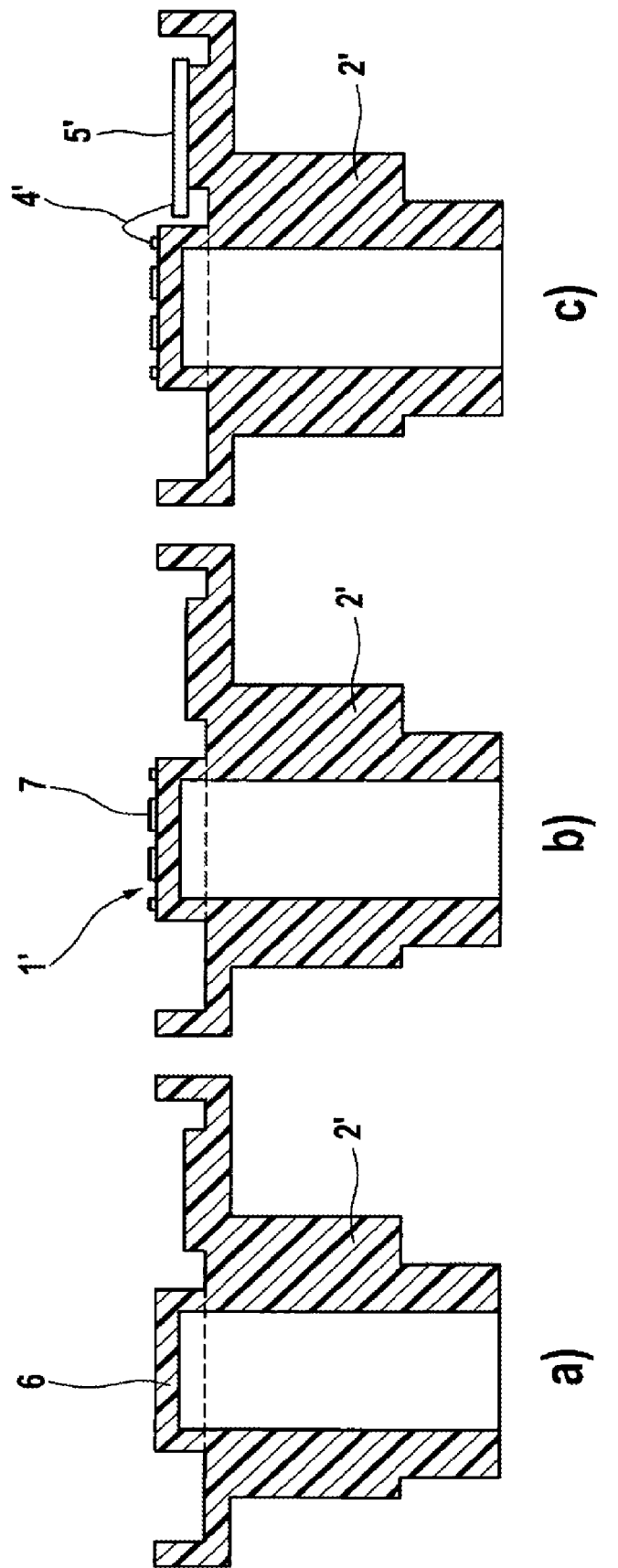
FIG. 2 is a third embodiment of a pressure sensor unit of the invention.

FIG. 2 shows a third embodiment of a pressure sensor unit of the invention. This embodiment consists in the full integration of sensor element 1' and housing 2'. In a first processing step, housing 2' and deformation body 6 are fabricated as an injection-molded part (FIG. 2a). Thereafter follows the coating of deformation body 6 with resistive structures (sensor means) 7 (FIG. 2b). This eliminates the processing step of connecting the sensor element 1' and housing 2'. The primary electronics such as board 5' and the necessary bonds 4' are fitted subsequently (FIG. 2c).

Consequently, the use of identical materials or materials with a similar temperature expansion coefficient for housing and sensor (element) allows the connection between the two parts to be inelastical ('rigid'). This offers the above-described joining possibilities of welding, cementing, one-piece injection molding as well as spray-depositing or extrusion-coating.

The invention claimed is:

1. A pressure sensor unit, comprising:
    a housing (2);
    at least one sensor element (1) arranged in the housing, the sensor element includes a deformation body (6) and at least one sensor (7) with the sensor (7) affixed to the deformation body (6) for sensing a deformation of the deformation body (6), wherein at least a part of the housing (2) which is connected to the sensor element (1) and a part of the sensor element (1) which is connected to the housing (2) are fabricated from plastic materials having identical or almost identical temperature expansion coefficients.

2. The pressure sensor unit of claim 1, wherein the housing (2) and the sensor element (1) are interconnected in an inelastic fashion, and the sensor (7) mounted onto the deformation body (6).

3. The pressure sensor unit of claim 1, wherein the housing (2) and the sensor element (1) are interconnected by way of welding, cementing, or spray-depositing.

4. The pressure sensor unit of claim 3, wherein the sensor (7) is mounted using an adhesive without silicon.

5. The pressure sensor unit of claim 3, wherein the housing (2) and the sensor element (1) are interconnected by laser welding or ultrasonic welding.

6. The pressure sensor unit of claim 1, wherein the housing (2) and the deformation body (6) of the sensor element are configured as a one-piece injection-molded part.

7. The pressure sensor unit of claim 6, the sensor means (7) is applied to the deformation body (6) by coating after fabrication of the injection-molded part.

8. The pressure sensor unit of claim 1, wherein the sensor (7) is printed, vacuum metallized, or sputtered onto the deformation body (6), and the sensor (7) is connected to an evaluating circuit (5) that is located remote from the sensor (7).

* * * * *